United States Patent [19]
Pizzolato

[11] Patent Number: 5,943,812
[45] Date of Patent: Aug. 31, 1999

[54] CRAB TRAP

[76] Inventor: John Pizzolato, 539 Brielle Rd., Manasquan, N.J. 08736

[21] Appl. No.: 09/014,926

[22] Filed: Jan. 28, 1998

[51] Int. Cl.[6] .................................................. A01K 69/08
[52] U.S. Cl. .................................................................. 43/58
[58] Field of Search .................................. 43/58, 60, 61, 43/64, 65, 73, 74, 100, 102, 103–105

[56] References Cited

U.S. PATENT DOCUMENTS

| | | |
|---|---|---|
| 2,755,594 | 7/1956 | Booth et al. |
| 3,841,016 | 10/1974 | Silva ........................................ 43/100 |
| 4,509,288 | 4/1985 | Shepherd ................................ 43/102 |
| 4,611,424 | 9/1986 | Tarantino ................................ 43/100 |
| 4,848,026 | 7/1989 | Wyman et al. .......................... 43/100 |

Primary Examiner—Thomas Price
Attorney, Agent, or Firm—Clifford G. Frayne

[57] ABSTRACT

A crab trap having a tapered body member of either circular or elliptical cross section, the crab trap having a first ingress end and a second egress end, the first ingress end having a cover removably secured thereto having a passageway for permitting entrance into the crab trap of crabs, but preventing the egress of crabs from the crab trap through the front cover, the egress end of the crab trap being open and dimensioned so as to permit undersized crabs to exit the crab trap under their own mobility or to be flushed from the crab trap when the crab trap is retrieved. The crab trap also has both a buoyancy member and a stability member to insure that the crab trap orients itself correctly on the ocean bed or bay bed, whether or not it is dropped or tossed into the water.

9 Claims, 4 Drawing Sheets

CRAB TRAP

BACKGROUND OF INVENTION

1. Field of Invention

This invention relates to pots or traps for capturing crabs and more particularly, to a trap which can be easily positioned properly by dropping or casting into the water and still further permits the capturing of crabs of a legal size, while permitting crabs of smaller size to escape the trap.

2. Description of the Prior Art

The crabbing industry has increasingly faced cyclic harvest of crabs due in part to over crabbing or pollution. This has led governmental agencies to impose regulations on the length of the crabbing season and the size of crabs permitted to be captured during the crabbing season. Additionally, governmental regulations have addressed the problem of catching one species of crab during a particular season while outlawing the capturing of another species of crab during a particular season. These regulations have by and large been an attempt to increase the crab population and to increase the population of crabs which are permitted to obtain a certain size before capturing.

In normal practice, crab traps of the current variety do not distinguish between sizes, thus it is up to the individual to separate and return crabs that are either out of season or undersize.

There are many devices which are designed for crabbing and Applicant has provided a list and copies of those known to Applicant in the Disclosure Document filed herewith.

Applicant's contribution to the crab trap art is a crab trap which will allow entry of crabs into the trap, but which will also allow crabs of a certain size the ability to exit the trap without being captured. These crabs may exit the trap under their own mobility or they may be in fact flushed from the trap when the trap is pulled in by the individual.

Further, the design of the trap is an improvement over traps heretofore known in that the design allows for the trap to be easily dropped vertically into the water and positioned or allows for the trap to be tossed a distance, such as from a pier, or dock, before settling into the water and positioning itself on the bottom. The trap can then be either left submerged and unattended for a duration of time or intermittently retrieved.

OBJECTS OF THE INVENTION

An object of the present invention is to provide for a novel crab trap which allows for the capture of crabs of a particular size, but allows crabs of a smaller size or species to exit the trap.

A further object of the present invention is to provide for a novel crab trap which is designed for settling in the appropriate orientation whether the trap is dropped vertically or tossed horizontally across the water before settling.

A still further object of the present invention is to provide for a novel crab trap which prevents the exit of crabs from the entrance way from which they entered.

A still further object of the present invention is to provide for a novel crab trap which can be easily disassembled and stacked for storage.

A still further object of the present invention is to provide for a novel crab trap which is light weight.

SUMMARY OF THE INVENTION

A crab trap having a tapered body member of either circular or elliptical cross section, the crab trap having a first ingress end and a second egress end, the first ingress end having a cover removably secured thereto having a passageway with a means for permitting entrance into the crab trap of crabs, but preventing the egress of crabs from the crab trap through the front cover, the egress end of the crab trap being opened and dimensioned so as to permit undersized crabs to exit the crab trap under their own mobility or to be flushed from the crab trap when the crab trap is retrieved. The crab trap also has both a buoyancy member and a stability member to insure that the crab trap orients itself correctly on the ocean bed or bay bed whether or not it is dropped or tossed into the water.

BRIEF DESCRIPTION OF THE DRAWINGS

These and other objects of the present invention will become evident particularly when taken in view of the following illustrations wherein.

DETAILED DESCRIPTION OF THE DRAWINGS

Figure 1:
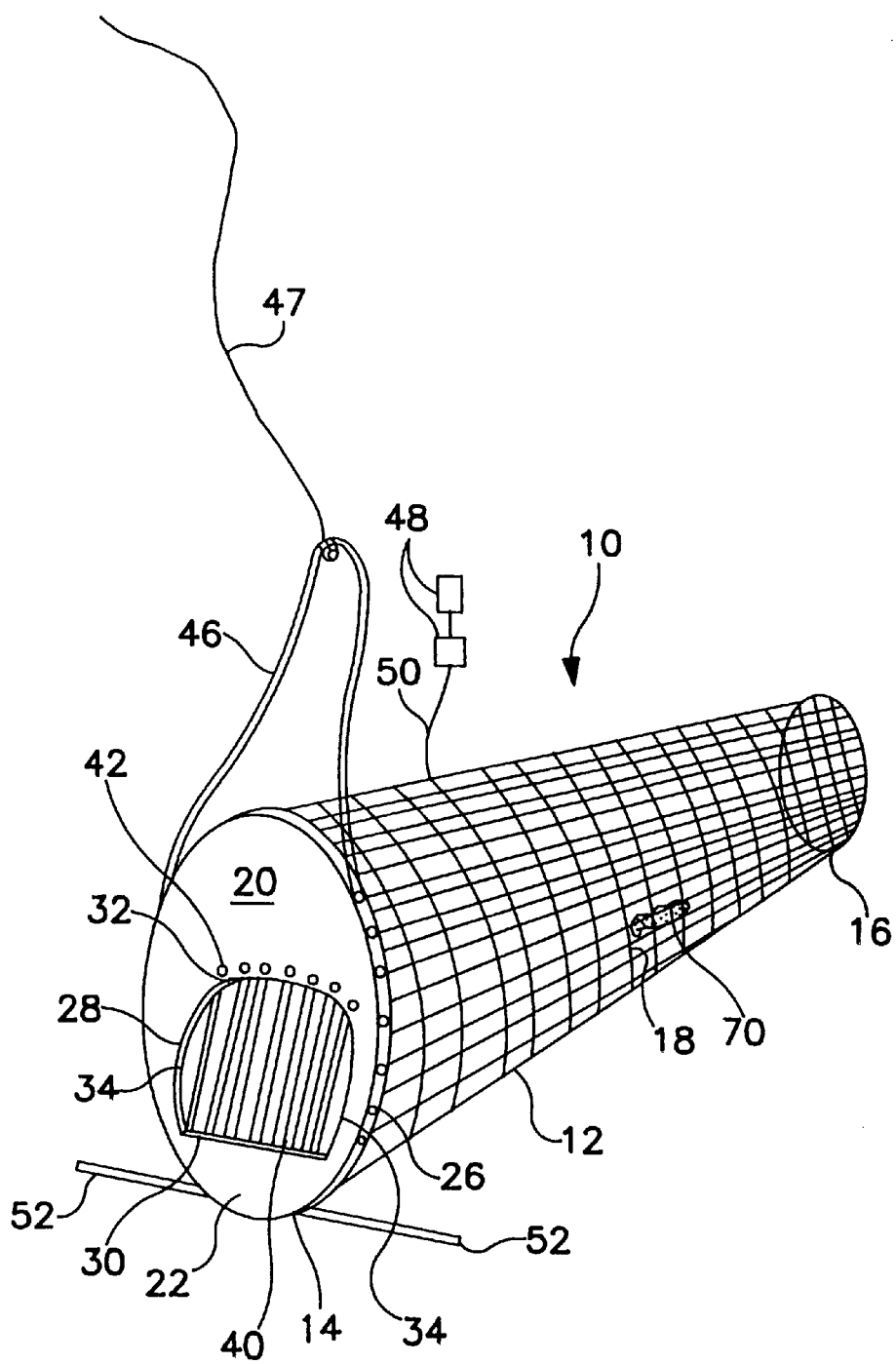
FIG. 1 is a prospective view of the assembled crab trap.

FIG. 1 is a perspective view of the assembled crab trap 10. This embodiment of crab trap 10 comprises a conical mesh body member 12 having a first end 14 and a second end 16. Conical body member 12 is formed, preferably, of wire mesh of sufficient strength to survive the rigors of submersion in the ocean or bay yet light enough to allow for easy handling of the crab trap and throwing or tossing of the crab trap into the water as will be described hereafter. Preferably, the mesh 18 presents a cross hatched mesh surface with apertures dimensioned of sufficient size to prevent the escape of crabs through the conical mesh body member 12 and to prevent the egress of other sea creatures through the mesh 18, these other sea creatures thereby being prevented from attacking the crab bait which would be positioned within conical mesh body member 12.

Figure 3:
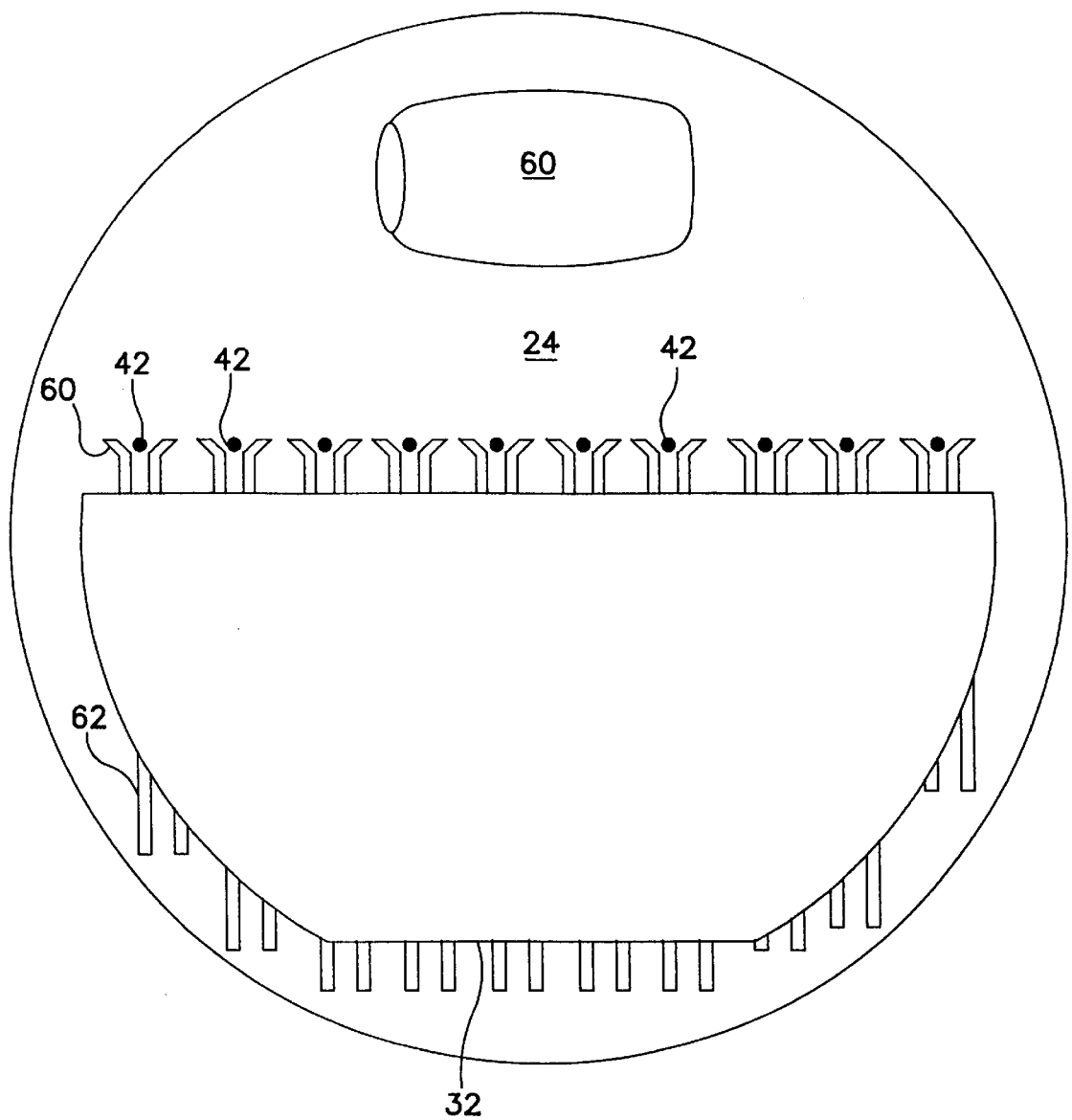
FIG. 3 is a rear view of the cover of the entrance way to the crab trap.

First end 14 of conical body mesh member 12 is adapted to receive a removable cover 20 having an outer face 22 and an inner face 24 as illustrated in FIG. 3. In the embodiment illustrated in FIG. 1, cover 20 is illustrated as being generally circular and conical mesh member 12 is illustrated as being generally circular and cross section. In a second embodiment, cover 20 could be generally elliptical and the cross section of conical mesh member 12 could also be elliptical in cross section area.

About the periphery of cover 20 are a plurality of securing apertures 26 which allow the user to secure cover 20 to end 14 of conical body member 12 by means of string, ties or the like interconnecting apertures 26 with mesh 18. Cover 20 is thus secured to first end 14 of conical body member 12. First end 14 of conical body member 12 is dimensioned larger in cross section area than is second end 16 of conical body member 12 in that first end 14 and cover 20 were designed for the ingress end of conical body member 12. Formed in cover 20 is an ingress aperture or passageway 28 having a lower lip 30, an upper lip 32, and side lips 34. Lower lip 30 in cover 20 is generally horizontal and is positioned as low as possible in cover 20 so as to permit the ingress of crabs through aperture or passageway 28.

A plurality of vertically depending rotatable rods 40 are positioned on the inner face side 24 of cover 20 and rotatably depend from a plurality of apertures 42 positioned above upper lip 32 of aperture 28 and extend below lower lip 30. These rods 40 are rotatable inwardly into conical mesh member 12 so as to permit crabs ingress into body member 12. The rods, depending below lower lip 30 are not rotatable outwardly and therefore, once a crab has ingressed into conical member 12, it may not egress through cover 20.

Second end 16 of conical member 12 is again illustrated in circular cross section in FIG. 1, but another embodiment of second end 16 would include an elliptical cross sectional second end 16. Second end 16 is dimensioned to allow crabs which are under sized, to exit conical member 12 under their own power or as will be more fully described hereafter, they would be forced or flushed out of second end 16 when crab trap 10 was retrieved from the ocean bed or bay bed where it had sat.

Other features evident with respect to the embodiment disclosed in FIG. 1 and which will be described more fully hereafter, include a handle 46, preferably wire, secured to the mesh 18 of conical mesh member 12, proximate to first end 14. Attached to handle 46 would be a rope or string 47 which would allow the user to either drop the crab trap 10 into the water from a pier or boat, or to toss or throw the crab trap a distance from the pier, land or boat before the crab trap would settle into the water and onto the ocean bed or bay bed.

To aid in the descent of the crab trap to the ocean bed or bay bed and to achieve the correct orientation, a buoyancy means 48 in the form of a plurality of buoys would be secured by wire or string 50 to conical mesh member 12 or to cover 20. These small buoys would not have sufficient buoyancy, to cause the crab trap 10 to float, but would rather aid in the orientation of the crab trap as it sunk to its resting place on the ocean bed or bay bed. Alternatively, buoyancy means 48 could be secured to the upper portion of inner face 24 above aperture 28. It could be in the form of a foam buoyancy device or small air filled container. Similarly, removably secured to cover 20 would be one or more orientation stability struts 52 which would extend outwardly from cover 20. These again would aid in the settling of the crab trap 10 in the correct orientation on the ocean bed or bay bed such that the orientation of aperture 28 is correct for permitting crabs to ingress the crab trap 10.

Figure 2:
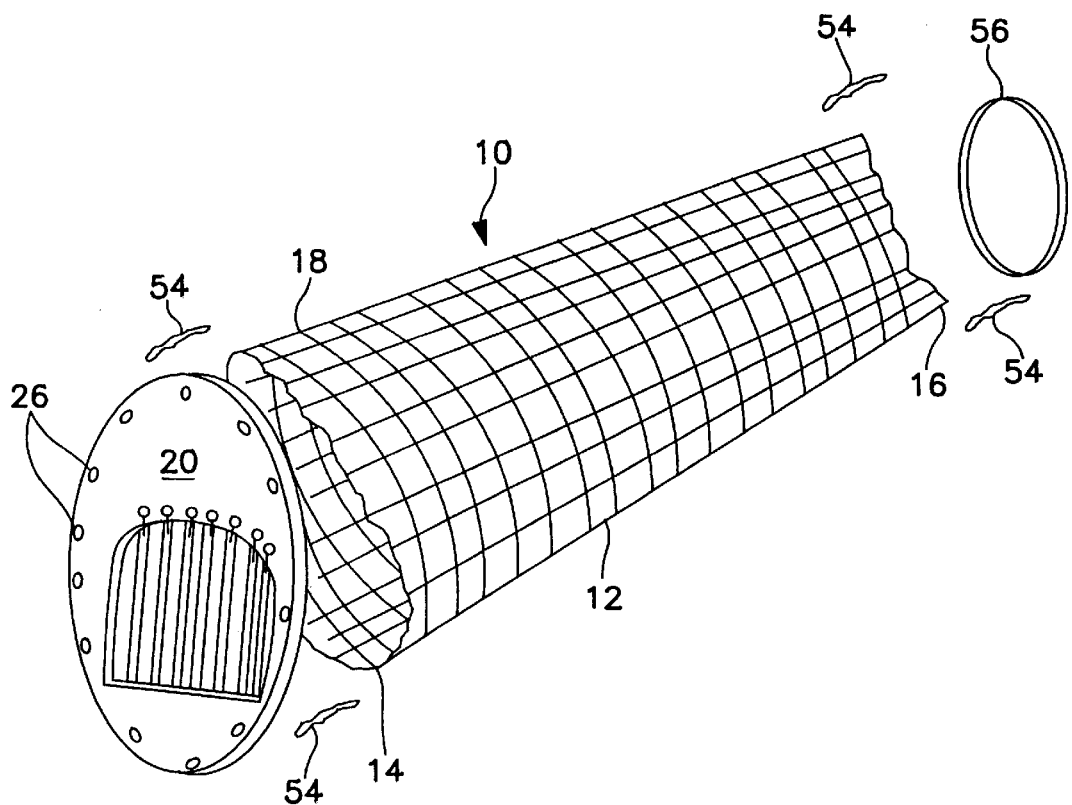
FIG. 2 is an exploded view of the crab trap.

FIG. 2 is a partially exploded view of the crab trap 10 illustrating the relationship between conical mesh body member 12 cover 20, first end 14 and second end 16. As previously stated, the conical mesh body member 12 is formed of a mesh material. Common chicken wire or similar type mesh material can provide the least expensive type of mesh to be utilized with the crab trap 10 and still have it function correctly. It can be seen that cover 20 having a plurality of apertures 26 about the periphery provides a means for securing cover 20 to conical mesh body member 12 by means of a plurality of ties 54 which can be inserted through apertures 20 and then wound about or tied about the mesh 18 of conical mesh body member 12, proximate to open end 14 thus securing cover face 20 over open end 14. The mesh 18 for forming conical member 12 can be rolled and seam tied to the desired form or depending upon the mesh material, spot welded in order to retain the conical shape.

Depending upon the tensile strength of the mesh 18, smaller open end 16 can be formed without any additional support and thus the opening in smaller end 16 would be defined merely by the mesh 18. However, if addition support was required, then a circular ring 56 could be inserted into smaller open end 16 and secured similarly by a series of ties 54 about ring 56 and a portion of the mesh 18 comprising conical mesh body member 12.

FIG. 3 is a rear view of cover 20 illustrating rear face 24. In this embodiment, cover 20 is again shown in a generally circular configuration however, an elliptical configuration in combination with an elliptical cross section of mesh body member 12 would also be suitable. Rear face 24 of cover 20 illustrates the plurality of apertures 42 in cover 20 through which rods 40 are rotatably positioned. Rods 40 would be positioned through apertures 42 and a loop formed thereon such that the rods would rotate about that portion of cover 20 between aperture 42 and upper lip 32 of opening 28. The depending vertical rods 40 are designed to provide a one way passageway into conical mesh body member 12 so that crabs may ingress into the crab trap 10, but they cannot egress through passageway 28. The rods 40 depend from apertures 42 down to a position below lower lip 30 on the interior face of cover 20. In that regard, the rods 40 may be displaced inwardly as a crab enters the crab trap 10, but a crab attempting to reverse the path and exit through passageway 28 would not be able to do so in that the rods would not rotate outwardly as their lower ends would engage with lower lip 32.

In order to insure that the vertical rods are not displaced laterally such that a crab might exit through passageway 28, there is formed on inner face 24 of cover 20, Y-shaped guides 60 associated with each aperture 42. This helps to guide depending rod 40 to a vertically dependent position as it swings back after a crab has entered passageway 28. In addition to the upper guides 60, there are lower guides 62 in alignment with upper guides 60 for engagement with the lower end of rod 40 to insure that it maintains its vertical position thus maintaining the one way characteristic of passageway 28. FIG. 3 also illustrates the alternative location for buoyancy means 48.

Figure 4:
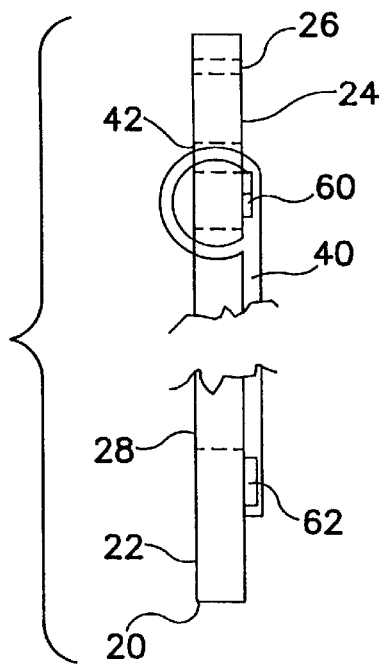
FIG. 4 is a side view of the cover of the crab trap.
Figure 5:
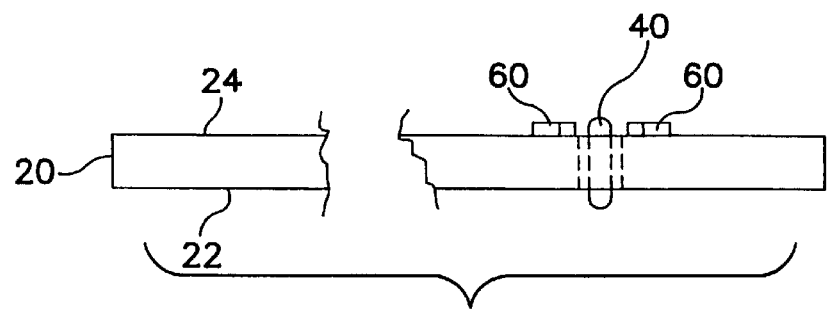
FIG. 5 is a partial top view of the cover of the crab trap.

FIG. 4 is a side view of cover 20 illustrating rod 40 depending from an aperture 42 over passageway 28. It can be seen that one half of the Y-guide 60 is adjacent one side of rod 40 while the other half of the Y-guide (not shown) would be on the opposite side of rod 40. Rod 40 depends vertically below lower lip 30 and there, at its lower end, is engaged between guides 62. In this manner, when the passageway is closed by the vertical dependency of all of rods 40, they are not easily laterally displaced to allow the exit from the crab trap 10. Further, when the rods 40 are displaced upwardly upon the ingress of a crab, the guides 60 and 62 aid in the correct repositioning of the rods 40 to their vertically dependent position to prevent egress through passageway 28. Rods 40 are preferably made from metal or other suitable material such that they will return quickly to their depending closed position after having been rotatably displaced by an entering crab.

It will be recognized that the diameter of first end 14 and second end 16 of conical mesh body member 12 can be varied depending upon the size of the crabs which may be legally caught and which may not be caught. In the preferred embodiment, first end 14 would be from 10 to 12 inches in diameter while second end 16 would be from 3¼ to 4 inches in diameter. In this configuration most small crabs which may be illegal to catch can exit through second end 16 under their own mobility or when the crab trap 10 is retrieved by means of rope 47 and handle 46, the smaller crabs would be flushed from crab trap 10 through second end 16.

The bait 70 as illustrated in FIG. 1 would be tied within crab trap 10 such that if one were crabbing from a pier with the crab trap visible directly below the user, the entry of a small crab into the crab trap 10 could be detected and the user could merely pull on rope 47 and handle 46 such that the smaller crab would exit second end 16 before having the opportunity to attack the bait. Similarly, the size of the apertures in the mesh opening are dimensioned so as to prevent the exit of crabs through the side walls of body member 12, but also to prevent fish or other non-desirous creatures from attacking the bait and preserving it for crabs of a certain size. Similarly, the length of the trap is one of discretion, however, it has been determined that a trap of the length of between 2 and 3½ feet is preferable with 2 feet being the optimum.

If the tensile strength of the mesh 18 used for form conical body member 12 is sufficient, then no lateral tubular supports along the length of conical body member 12 are required, however, if the mesh 18 is of insufficient strength, then the alternative embodiment would be to position one or more tubular support struts between first end 14 and second end 16 to add greater structural integrity. Applicant has found no need for this, even with the use of a mesh of the tensile strength of common chicken wire.

Figure 6:
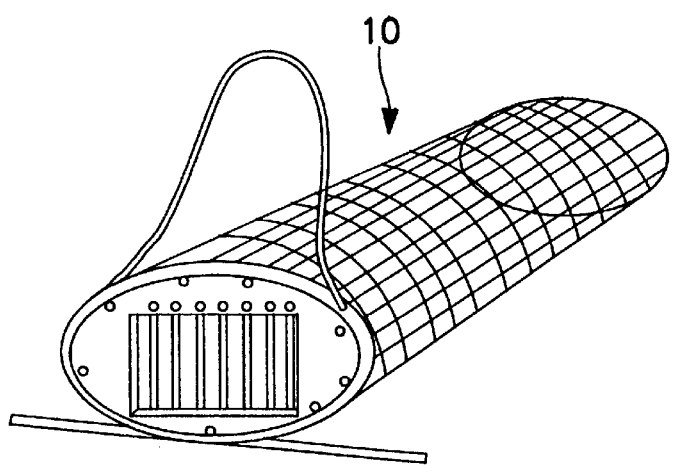
FIG. 6 is a perspective view of a second embodiment of the crab trap.

While the embodiment thus far disclosed illustrates a conical mesh body member of circular cross section with a circular cover 20 and circular second end 16, it will be recognized that the cross sectional shape of the crab trap may be varied to that of an elliptical shape without departing from the spirit and scope of the invention. An elliptical shape would permit the aperture 28 and in particular, lower lip 30 of aperture 28 to be positioned closer to the ocean bed or bay bed for the attraction and easier ingress of crabs through passageway 28. FIG. 6 is illustrative of this design. All other features as heretofore described with respect to the crab trap 10 of circular cross section would apply.

While the present invention has been described with respect to the exemplary embodiments thereof, it will be recognized by those of ordinary skill in the art that many changes and additions are possible. Therefore, it is manifestly intended that the subject matter of the present application be only limited by the scope of the claims and equivalence thereof.

I claim:

1. A crab trap comprising:
    a tapered, mesh body member having a first ingress end and a second smaller egress end, said first ingress end having a cover face removably secured thereto, said cover face having an exterior surface and an interior surface and having formed therein, a one way passageway for the ingress of crabs, said second smaller egress end of said tapered mesh body member being open;
    said removable cover face having a plurality of apertures about its periphery for removably securing said cover face to said mesh body member about said first ingress end, said passageway formed in said cover face having an upper sill and a lower sill, said upper sill having a plurality of independent rods depending therefrom to a point below said lower sill, said depending rods independently rotatable inwardly to permit ingress of crabs and non-rotatable outwardly to prevent egress of crabs through said passageway.

2. The crab trap in accordance with claim 1 wherein said cover face of said crab trap has positioned on said interior surface thereof, a plurality of first guide stops alignable with said upper sill of said passageway and a plurality of second guide stops alignable proximate said lower sill of said passageway, said upper sill guide stops and said lower sill guide stops in alignment with and maintaining said rotatable depending rods in substantially vertical alignment.

3. The crab trap in accordance with claim 2 wherein said plurality of first guides on said inner face of said cover face define a Y-shaped guide about said depending rod insuring said rod returns to a vertical depending position after being displaced.

4. The crab trap in accordance with claim 3 wherein said tapered body member is formed of a wire mesh having apertures no greater than one and one half inches.

5. The crab trap in accordance with claim 4 wherein said crab trap has a orientation stability strut removably secured thereto said stability strut secured below said lower sill of said passageway, said stability strut extending horizontally outwardly from said removable cover face, perpendicular to said tapered, mesh body member, said stability strut providing stability and orientation to said crab trap for settling in the water.

6. The crab trap in accordance with claim 1 wherein said tapered, mesh body member is reinforced with one or more longitudinal rod members extending from said first ingress end to said second egress end and secured to said mesh body member in order to maintain shape.

7. The crab trap in accordance with claim 5 wherein said crab trap has buoyancy member secured thereto proximate said upper sill of said cover face for orientation of said crab trap for settling in the water.

8. The crab trap in accordance with claim 1 wherein said tapered, mesh body member is circular in cross section.

9. The crab trap in accordance with claim 1 wherein said tapered, mesh body member is elliptical in cross section.

* * * * *